(12) United States Patent
Laramee et al.

(10) Patent No.: US 11,897,595 B2
(45) Date of Patent: Feb. 13, 2024

(54) AIRCRAFT LINE OR HARNESS FASTENING SYSTEM

(71) Applicant: AIRBUS CANADA LIMITED PARTNERSHIP, Mirabell (CA)

(72) Inventors: Stephane Laramee, Mirabel (CA); Rikhil Sukumar Shetty, Mirabel (CA)

(73) Assignee: Airbus Canada Limited Partnership, Mirabel (CA)

( * ) Notice: Subject to any disclaimer, the term of this patent is extended or adjusted under 35 U.S.C. 154(b) by 0 days.

(21) Appl. No.: 17/902,177

(22) Filed: Sep. 2, 2022

(65) Prior Publication Data
US 2023/0089874 A1 Mar. 23, 2023

(30) Foreign Application Priority Data
Sep. 20, 2021 (CA) .................................. CA 3131605

(51) Int. Cl.
*H02G 3/32* (2006.01)
*B64C 1/40* (2006.01)
*F16L 3/08* (2006.01)
*B64D 15/00* (2006.01)
*F16L 3/10* (2006.01)

(52) U.S. Cl.
CPC .............. *B64C 1/403* (2013.01); *H02G 3/32* (2013.01); *B64D 15/00* (2013.01); *F16L 3/1025* (2013.01); *F16L 3/1091* (2013.01)

(58) Field of Classification Search
CPC .......... H02G 3/32; B64C 1/403; B64C 1/406; B64D 15/00; B64D 15/20; F16L 3/123; F16L 3/1025; F16L 3/1091
See application file for complete search history.

(56) References Cited

U.S. PATENT DOCUMENTS

| | | | | |
|---|---|---|---|---|
| 3,716,650 A | * | 2/1973 | de Mecquenem | H02G 7/12 24/135 R |
| 4,393,998 A | * | 7/1983 | Allen | F16L 3/18 248/74.1 |
| 6,135,398 A | * | 10/2000 | Quesnel | G02B 6/4471 248/74.1 |

(Continued)

FOREIGN PATENT DOCUMENTS

| | | | |
|---|---|---|---|
| EP | 2060369 A1 * | 5/2009 | B25J 19/0025 |
| EP | 2399823 A1 | 12/2011 | |
| EP | 3657057 A1 | 5/2020 | |

OTHER PUBLICATIONS

European Search Report from corresponding European application No. 22196724.3, dated Feb. 10, 2023.

*Primary Examiner* — Tan Le
(74) *Attorney, Agent, or Firm* — Greer, Burns & Crain, Ltd.

(57) ABSTRACT

An aircraft line or harness fastening system with a clamp attaching the line or harness to the aircraft. A bobbin within the clamp surrounds the line or harness, wherein the bobbin is smaller than the clamp and is circular in shape to enable rotation of the bobbin within the clamp. The bobbin includes two separate complementary parts that fit together around the line or harness. Each of the two separate complementary parts include a tab and a recess, wherein the tab of one of the complementary parts fits into the recess on the other of the complementary parts.

20 Claims, 8 Drawing Sheets

(56) References Cited

U.S. PATENT DOCUMENTS

| | | | |
|---|---|---|---|
| 7,770,848 B2* | 8/2010 | Johnson | F16L 3/1207 |
| | | | 248/65 |
| 10,761,285 B2* | 9/2020 | Courchaine | G02B 6/4446 |
| 2003/0183733 A1* | 10/2003 | Pisczak | H02G 7/053 |
| | | | 248/229.23 |
| 2006/0272848 A1 | 12/2006 | Guthke et al. | |
| 2009/0140106 A1 | 6/2009 | Johnson et al. | |
| 2012/0160962 A1 | 6/2012 | Holvoet et al. | |
| 2017/0146154 A1 | 5/2017 | Tally et al. | |

* cited by examiner

AIRCRAFT LINE OR HARNESS FASTENING SYSTEM

CROSS-REFERENCES TO RELATED APPLICATIONS

This application claims the benefit of the Canadian patent application No. 3131605 filed on Sep. 20, 2021, the entire disclosures of which are incorporated herein by way of reference.

FIELD OF THE INVENTION

In general, this disclosure relates to a fastening system for a line or harness in an aircraft. More particularly, the line or harness may form part of an aircraft wing anti-ice system.

BACKGROUND OF THE INVENTION

There are many concerns surrounding aircraft safety and maintenance. In particular, aircraft have many lines or harnesses which run throughout the aircraft for electronics or other control systems. In a specific example, aircraft include systems to detect and prevent ice buildup on the wings. In an anti-ice system, bleed air is used on the leading edge of the wing to avoid ice formation on the wing. A pressure sensor 10 at the end of a Piccolo tube monitors air flow on each wing, see FIG. 1A. The pressure sensors are connected to a harness to receive power from a control board and to send a signal to an integrated air system. The harnesses are installed between the slats 12 and wing area and move as the slats are operated in a torsion movement, see FIG. 1B. Movement of the slats generates repetitive stress on the harness at the clamping points due to torsion which is generated by the friction between the harness and the clamp This torsional force causes the wire to shear, causing cutting, chafing and damage 14, and resulting in system failure, see FIG. 1C. Typically, damage is reported at approximately 3000 flight hours or 2000 flight cycles. Due to these damages, the harnesses have to be replaced.

One example of a prior art clamping system for a harness or line is shown in U.S. Publication No. 2006/272848, which teaches a holding device for accommodating one line of an aircraft. The holding device includes a guide body and a slide which permits the line to move or slide within the guide body in the longitudinal direction of the line to be held.

SUMMARY OF THE INVENTION

In one aspect, there is provided an aircraft line or harness fastening system, comprising a clamp for attaching the line or harness to the aircraft; and a bobbin within the clamp and surrounding the line or harness, wherein the bobbin is smaller than the clamp and is circular in shape to enable rotation of the bobbin within the clamp.

In a further aspect, there is provided an aircraft line or harness fastening system wherein the clamp comprises two separate complementary parts that fit together around the line or harness. In yet a further example, each of the two separate complementary parts of the bobbin include a tab and a recess, wherein the tab of one of the complementary parts fits into the recess on the other of the complementary parts. In still a further example, each of the tabs includes a notch which locks the tab into the recess.

In a further aspect, there is provided an aircraft line or harness fastening system wherein the clamp and bobbin are made of PEEK material.

In yet a further aspect, there is provided an aircraft line or harness fastening system comprising silicone tape around the harness or line within the bobbin.

In another aspect, there is provided a bobbin for holding a line or harness of an aircraft, comprising two separate complementary parts that fit together around the line or harness wherein each of the two separate complementary parts include a tab and a recess, wherein the tab of one of the complementary parts fits into the recess on the other of the complementary parts. In one example, each of the tabs includes a notch which locks the tab into the recess.

BRIEF DESCRIPTION OF THE DRAWINGS

The invention will be further understood from the following description with reference to the attached drawings.

DETAILED DESCRIPTION OF THE PREFERRED EMBODIMENTS

The exemplary embodiments of the present disclosure are described and illustrated below to encompass an aircraft line or harness fastening system, for example purposes only. Of course, it will be apparent to those of ordinary skill in the art that the embodiments discussed below are exemplary in nature and may be reconfigured without departing from the scope and spirit of the present disclosure. However, for clarity and precision, the exemplary embodiments as discussed below may include optional steps, methods, and features that one of ordinary skill should recognize as not being a requisite to fall within the scope of the present disclosure.

Figure 1A:
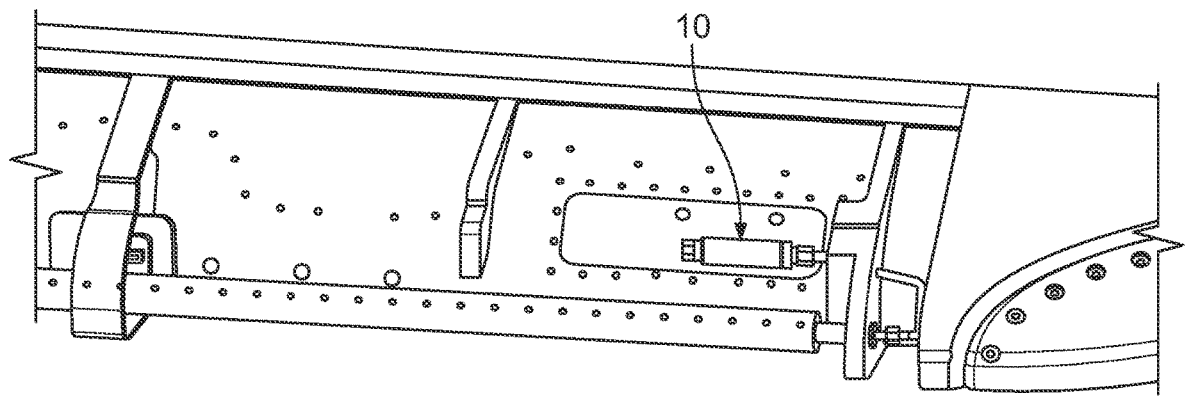
FIG. 1A illustrates a pressure sensor on the edge of a wing.
Figure 1B:
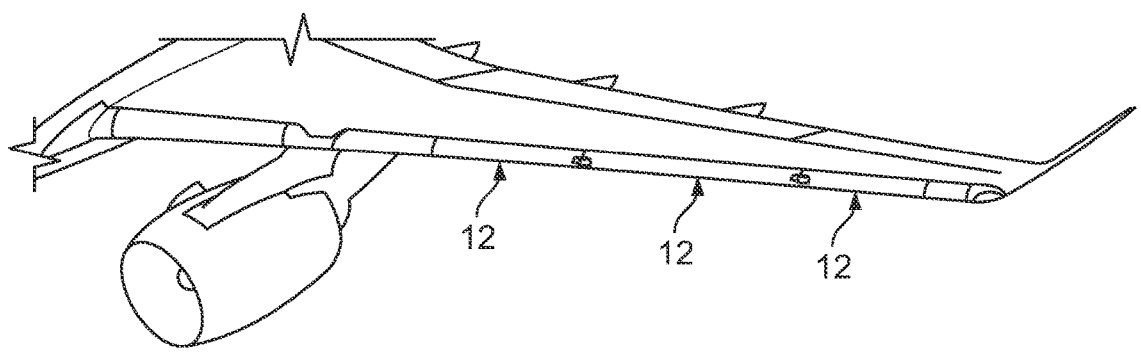
FIG. 1B illustrates an edge of a wing having three slats.
Figure 1C:
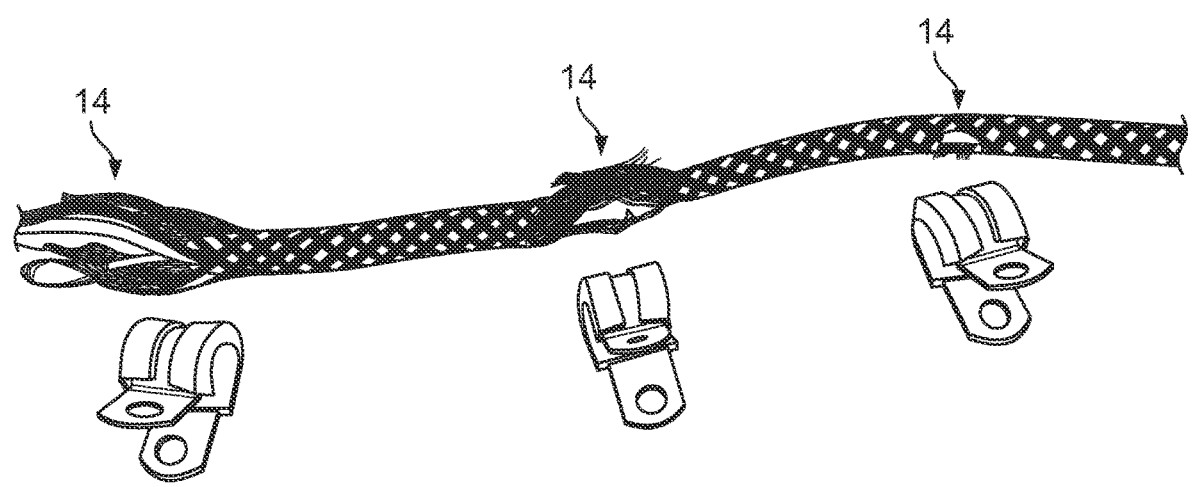
FIG. 1C illustrates a harness that has been frayed, cut, chaffed and/or damaged at the location of the clamps.
Figure 2:
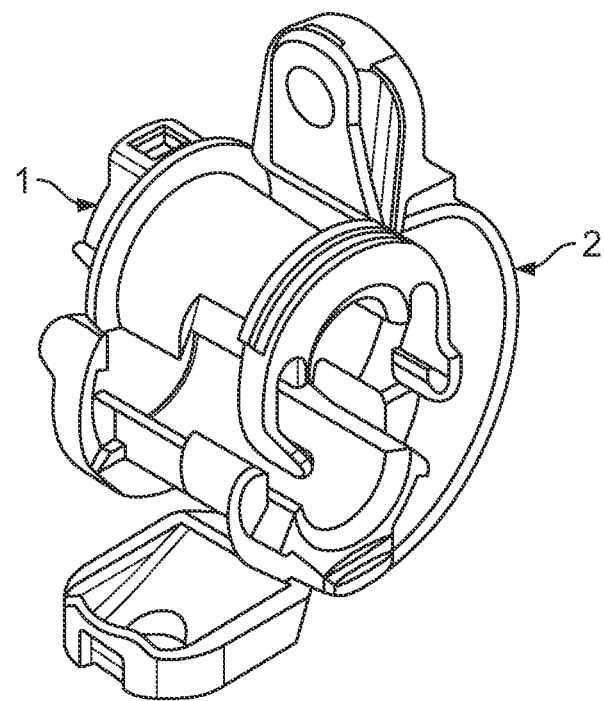
FIG. 2 illustrates a clamp and bobbin in an open position.

One example embodiment is shown in FIG. 2, there is provided a fastening system for an aircraft wing harness which includes an additional element called a bobbin 1 to be inserted into an existing clamp 2 for a harness. The bobbin 1 is installed around the harness in such a way that the bobbin 1 surrounds the harness. The bobbin 1 is then inserted into the clamp 2. As a result of use of the bobbin 1, the clamp 2 may be larger than typical previous clamps.

Figure 3:
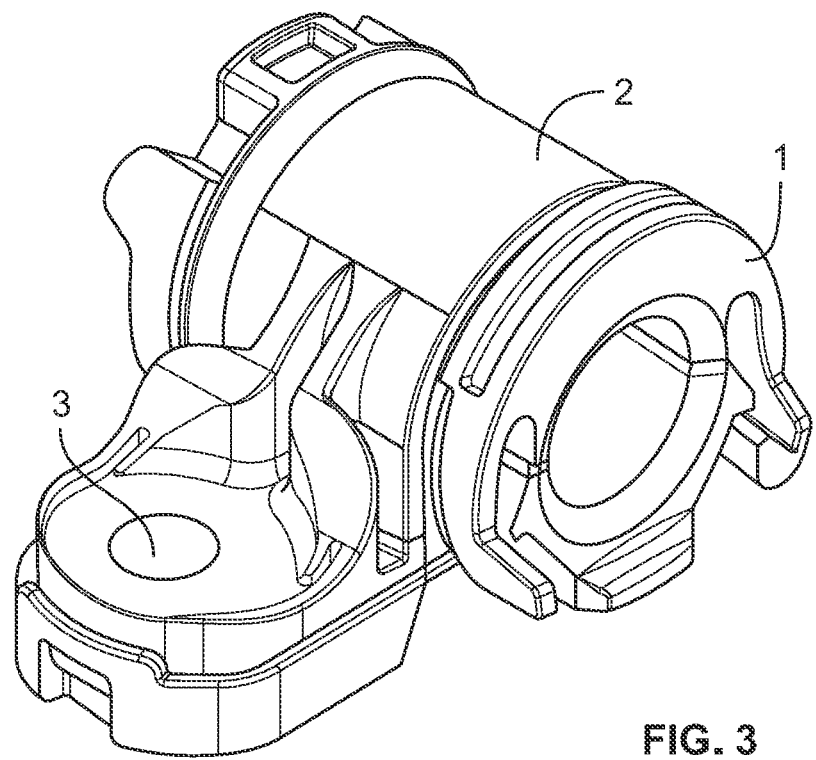
FIG. 3 illustrates a clamp and bobbin in a closed position.
Figure 4:
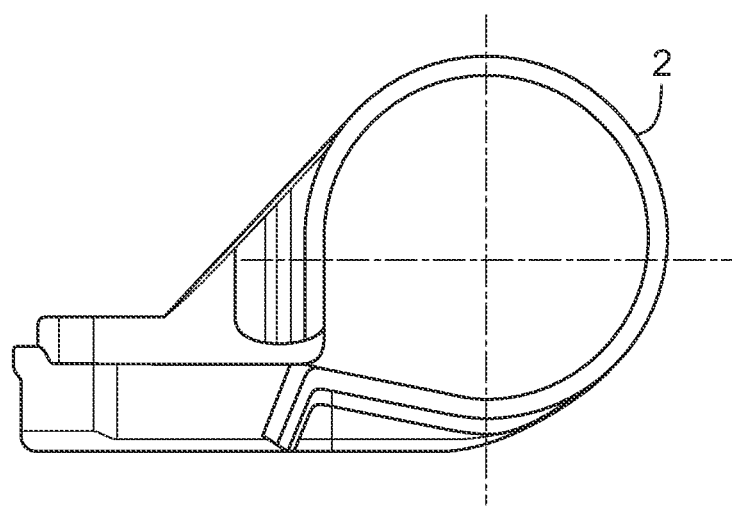
FIG. 4 illustrates a clamp.

FIG. 3 shows an example of the fully assembled bobbin and clamp. Once the clamp 2 is closed around the bobbin 1, the clamp 2 is secured on the structure through a fixation means installed in a hole 3 of the clamp 2. In one example embodiment, the clamp is a one-piece element flexible enough to be opened and its diameter is large enough to accept the presence of the bobbin 1 and to encircle the entire bobbin 1. FIG. 4 shows an example clamp 2 having a diameter large enough to accommodate the bobbin 1 therein with additional space for rotation of the bobbin 1 within the clamp 2.

Figure 5:
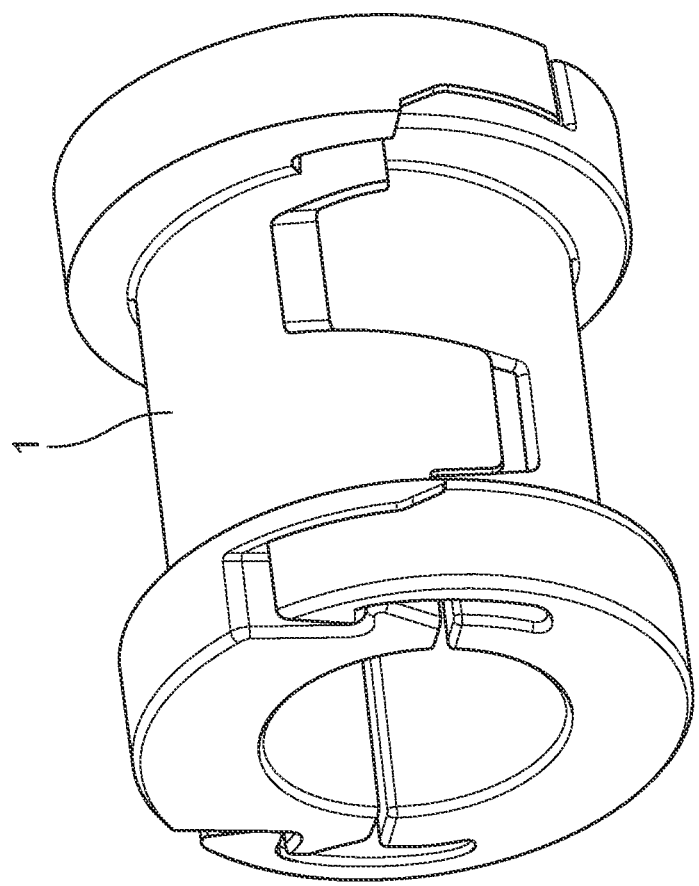
FIG. 5 illustrates a bobbin in a closed position.

In one example embodiment shown in FIG. 5, the bobbin 1 is provided as two complementary parts 20, 22. The two complementary parts 20, 22 are designed such that the interface between the parts enables a simple installation of the bobbin 1 around the harness. During installation, the two parts of the bobbin are placed on either side of the harness (not shown) by an operator. Then, the operator closes the bobbin 1 by clipping, snapping or closing the two parts 20, 22 together. The particular shape of the two parts 20, 22 enables the two parts to fit easily together and assists in a simple installation of the two parts to clip, snap or close around the harness and secure the bobbin 1 around the harness. In one example, there is some space between the clamp 2 and the bobbin 1 so that the bobbin 1 may easily rotate inside the clamp 2.

FIG. 5 represents a simplified bobbin in which the particular interface between the two parts assists in fitting the bobbin 1 around the harness. Furthermore, as the two parts 20, 22 are complementary, they can be placed in either position, with either part above or below the other.

Figure 6:
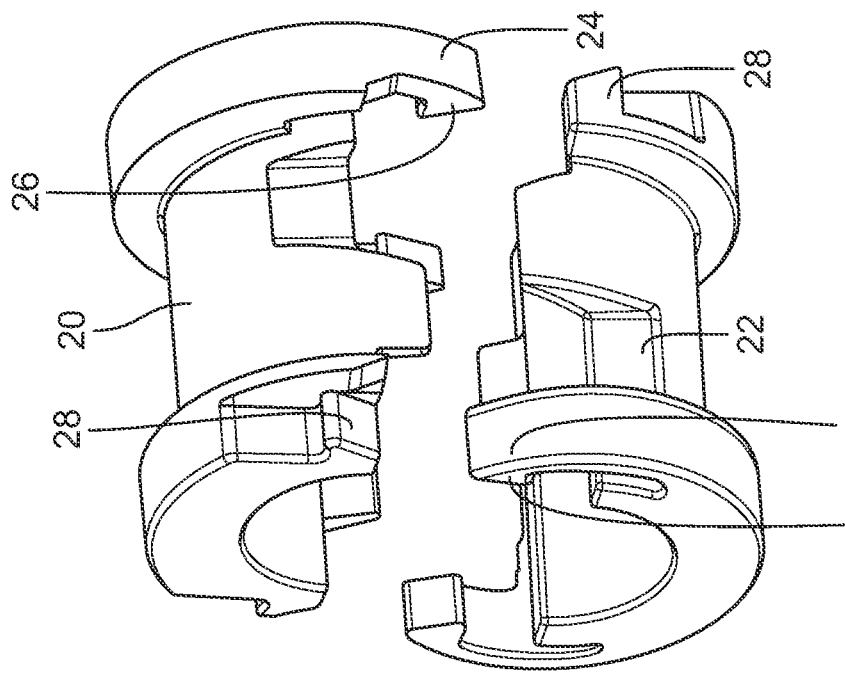
FIG. 6 illustrates a bobbin in an open position.

In an example embodiment, each part of the bobbin includes at least one tab 24 which can be easily pulled up by an operator to dissociate the parts. FIG. 6 illustrates the bobbin in an open position. The tabs are configured such that the tabs can be deformed to unclip one part from the other part. For example, the tab 24 of the first part 20 has a notch 26 so that it can be clipped into a complementary shape or recess 28 of the second part 22, while the tab 24 of the second part 22 has a notch 26 so that it can be clipped into a complementary shape or recess 28 of the first part 20. Pulling up the tabs 24 enables the two parts to be easily disassembled.

The present system provides the benefit in that the present clamp system for the harness does not require modification, nor does the surrounding structure. Thus, installers can continue using components of which they are familiar, with the addition of the installation of the bobbin within the clamp. Furthermore, there is no modification required to the aircraft structure. In addition, the bobbin is easy to manufacture and can be made out of PEEK (Polyetheretherketone) material, for example. The bobbin is easy to install and to remove, has a good strength-to-weight ratio, is creep-resistant and long-wearing, and withstands very high temperatures. In addition, when made from PEEK, the bobbin is radiation- and chemical-resistant with low water absorption.

Figure 7:
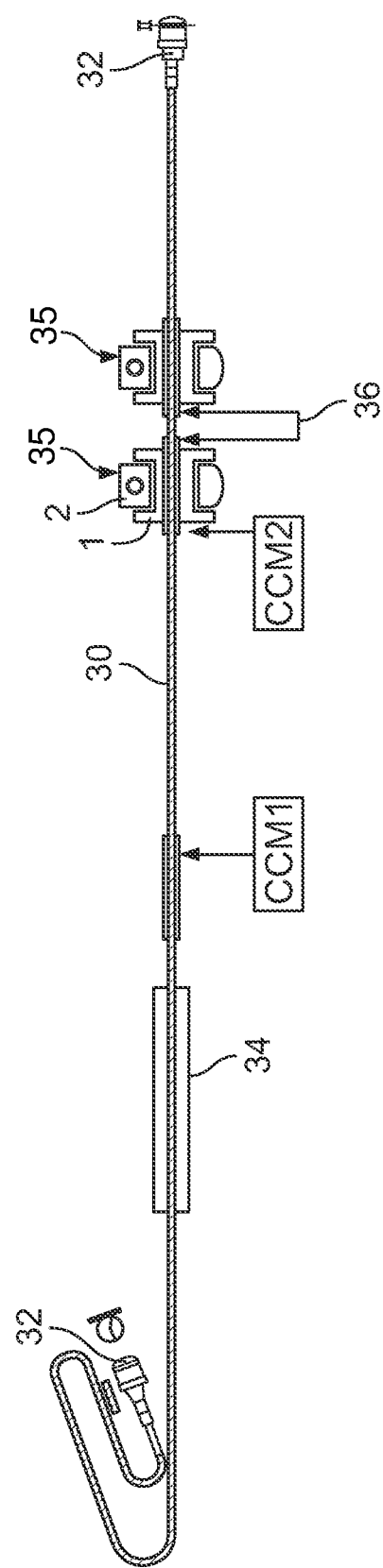
FIG. 7 illustrates use of the bobbin within a clamp installed on a section of a line or harness connecting two aircraft components together.

FIG. 7 shows an example use of the bobbin within a clamp to hold a harness, cable or other line within an aircraft. In this example, the harness 30 could be a high flex cable with a diameter of 0.368 in. connected between two end components 32, such as lights or sensors or a control panel or any other portion of the aircraft requiring routing of harnesses or lines. A slat tube 34 can optionally hold the harness 30 in place as it passes along the wing edge or through any other part of the aircraft. The harness 30 passes through the fastening system 35 by passing through the bobbin 1 which is installed within the clamp 2 to hold the harness 30 in place. Silicone tape 36 can optionally be used around the portion of the harness or line that resides within the bobbin 1 in order to further reduce or to avoid friction or chaffing against the bobbin. The silicone tape 36 can be self-fusing. Use of silicone tape 36 would assist in restricting the bobbin 1 from sliding on the harness 30 or line. The bobbin 1 can be used with different harness diameters since the harness diameter can be controlled. A Critical Clamp Marker (CCM1, CCM2) is a tape which may be used to mark the exact location of the clamp or to control the amount of slack during harness installation. Typically, such tapes have a very small thickness.

Figure 8:
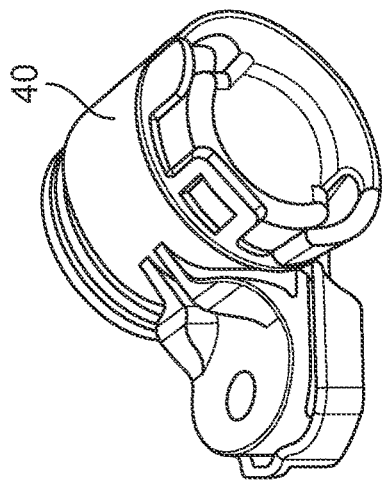
FIG. 8 illustrates an image of a bobbin in an open position and a second bobbin in a closed position along with a clamp.
Figure 8:
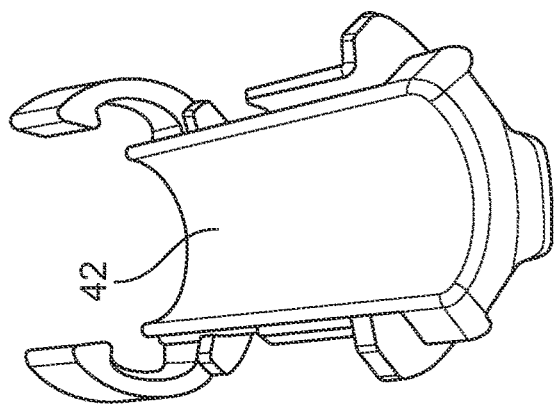
Figure 8:
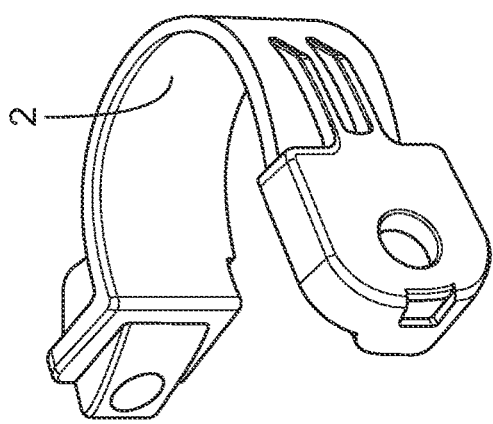
Figure 8:
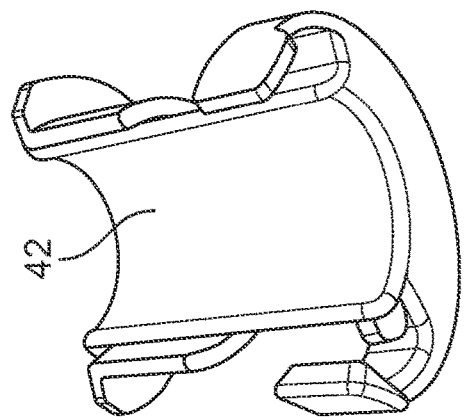

FIG. 8 shows an image of a bobbin in a closed position 40 and an open position 42 next to an image of the clamp 2. During assembly, silicone tape can optionally be wrapped around the harness prior to fitting of the bobbin. The bobbin is fit around the harness and snapped or clipped together. If required, the bobbin can be un-snapped or unclipped by pulling on the tabs. Once snapped or clipped around the harness, the bobbin is placed within the clamp and the clamp is secured to the aircraft.

Figure 9B:
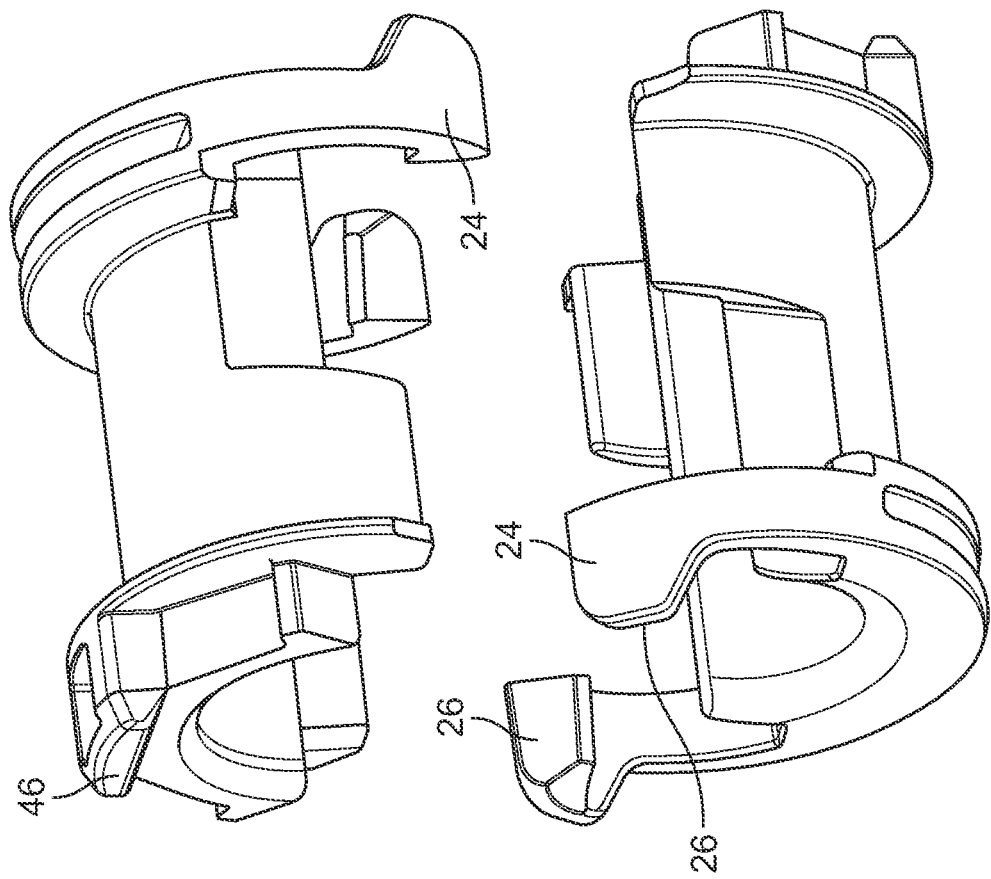
FIG. 9B illustrates a variation of the bobbin in an open position.
Figure 9A:
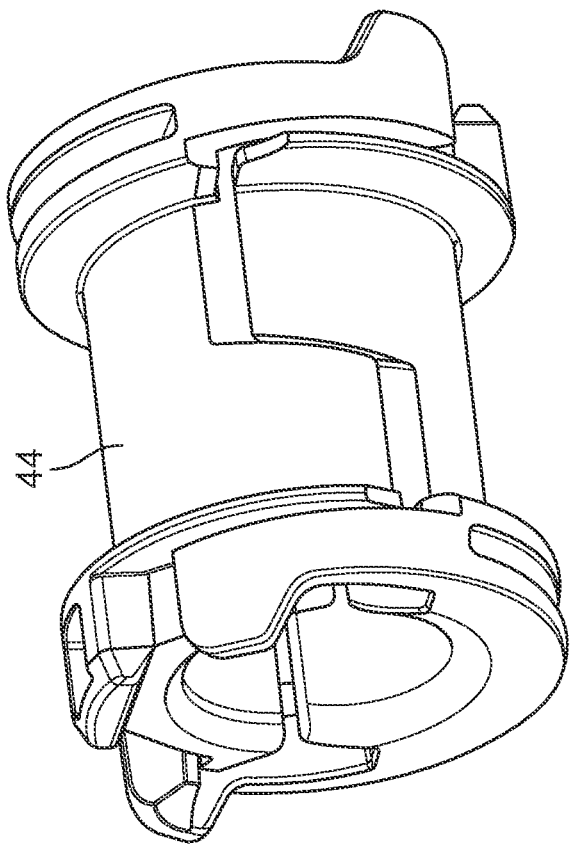
FIG. 9A illustrates a variation of the bobbin in a closed position.

FIG. 9A shows a variation of the bobbin 44 in a closed position, while FIG. 9B shows the variation in an open position. This version of the bobbin includes a lug 46, which is an extruded portion or notch to assist in unclipping. In order to unclip the assembled bobbin, a user may pull one or both notches 26 outward with thumbs while simultaneously pulling lug 46 upward with an index finger. The lug can be provided on one or both of the separate complementary parts of the bobbin. In one aspect it may be simpler for production and manufacturing to include a lug on both of the parts of the bobbin, in which case a user need only use one of the lugs for unclipping of the parts with one or both of the notches 26 on the same side of the bobbin.

It will be appreciated by one skilled in the art that variants can exist in the above-described arrangements and applications. For example, the type of material of the clamp and bobbin could vary. Alternatively, the tab and notch system could be formed of a different complementary coupling system. The clamp can be attached to the aircraft in any manner desired. Similarly, while the examples have related to a line or harness for an aircraft wing anti-ice system, the clamp and bobbin could be used to hold any line or harness throughout the aircraft.

Following from the above description, it should be apparent to those of ordinary skill in the art that, while the methods and apparatuses herein described constitute exemplary embodiments of the present invention, the invention described herein is not limited to any precise embodiment and that changes may be made to such embodiments without departing from the scope of the invention as defined by the claims. Consequently, the scope of the claims should not be limited by the preferred embodiments set forth in the examples but should be given the broadest interpretation consistent with the description as a whole. Likewise, it is to be understood that it is not necessary to meet any or all of the identified advantages or objects of the invention disclosed herein in order to fall within the scope of any claims, since the invention is defined by the claims and since inherent and/or unforeseen advantages of the present invention may exist even though they may not have been explicitly discussed herein.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A line or harness fastening system for an aircraft, comprising:
   a clamp for attaching the line or harness to the aircraft;
   a bobbin within the clamp and surrounding the line or harness, the bobbin comprising two separate complementary parts that fit together around the line or harness,
   wherein the bobbin is smaller than the clamp and is circular in shape to enable rotation of the bobbin within the clamp,
   wherein each of the two separate complementary parts of the bobbin include a pair of diametrically opposite tabs formed along an outer circumference of each of the two separate complementary parts, and
   wherein each of the tabs of one of the complementary parts fits into a corresponding recess on the other of the complementary parts.

2. The system of claim 1, wherein each of the tabs includes a notch which points inwardly and which locks the tab into the recess.

3. The system of claim 1, wherein the clamp and bobbin are made of PEEK material.

4. The system of claim 1, further comprising silicone tape around the harness or line within the bobbin.

5. A bobbin for holding a line or harness of an aircraft, comprising:
   two separate complementary parts that fit together around the line or harness;
   wherein each of the two separate complementary parts include a pair of diametrically opposite tabs formed along an outer circumference of each of the two separate complementary parts and a pair of recesses, and
   wherein each of the tabs of one of the complementary parts fits into a corresponding one of the recesses on the other of the complementary parts.

6. The bobbin of claim 5, wherein each of the tabs includes a notch which points inwardly and which locks the tab into the recess.

7. The bobbin of claim 5, wherein the two separate complementary parts are made of PEEK material.

8. The bobbin of claim 5, further comprising:
   a lug on at least one of the separate complementary parts, wherein the lug is formed as an extruded notch.

9. The system of claim 1, wherein the bobbin further comprises:
   a lug on at least one of the separate complementary parts, wherein the lug is formed as an extruded notch.

10. The system of claim 1, wherein the tabs and the recesses are located at terminal ends of each of the two separate complementary parts of the bobbin.

11. The bobbin of claim 5, wherein the tabs and the recesses are located at terminal ends of each of the two separate complementary parts of the bobbin.

12. The system of claim 1, wherein the bobbin further comprises:
   a pair of locator tabs diametrically opposite along an inner perimeter of each of the two separate complementary parts, and
   a pair of indents diametrically opposite along the perimeter of each of the two separate complementary parts for receiving one of the locator tabs.

13. The system of claim 12, wherein each of the pair of locator tabs is adjacent to one of the pair of indents.

14. The bobbin of claim 5, further comprising:
   a pair of locator tabs diametrically opposite along an inner perimeter of each of the two separate complementary parts, and
   a pair of indents diametrically opposite along the perimeter of each of the two separate complementary parts for receiving one of the locator tabs.

15. The bobbin of claim 14, wherein each of the pair of locator tabs is adjacent to one of the pair of indents.

16. The system of claim 1, wherein leading edges for each of the tabs and each of the recesses are rounded.

17. The bobbin of claim 5, wherein leading edges for each of the tabs and each of the recesses are rounded.

18. The system of claim 1, wherein the bobbin further comprises a slot adjacent to each of the tabs.

19. The bobbin of claim 5, further comprising a slot adjacent to each of the tabs.

20. The bobbin of claim 5, further comprising silicone tape around the harness or line within the bobbin.

* * * * *